United States Patent Office 2,864,728
Patented Dec. 16, 1958

1

2,864,728

COPPER CONDUCTOR COATED WITH SILICONE RESIN COMPOSITION

Albert J. Predota and Harry J. Kiefer, Cleveland, Ohio, assignors to The Glidden Company, Cleveland, Ohio, a corporation of Ohio No Drawing. Application July 12, 1954
Serial No. 442,894

2 Claims. (Cl. 117—232)

This invention relates to improved silicone wire enamels and to copper wire and other conductors coated therewith.

The use of pure silicone resins for the provision of wire enamels resistant to high temperature exposures has long been desired. There have been several disadvantages, however, in connection with the application of such resins to bare copper wire and other copper conductors. For one thing, the copper acts as an inhibitor and retards or prevents satisfactory curing of the resins, thereby entailing slow application speeds and poor solvent resistance. For another, the copper itself is subject to oxidation, presumably due to the porosity or breathing effect of the undercured silicone film.

Most of the above disadvantages have been overcome to a large measure by using silicone copolymers in place of pure silicones. While the heat resistance is thereby reduced to some extent, it has proven to be superior to that of most purely organic films. For nominal film thicknesses the copolymer type of material has proven to be of distinct advantage. However, when heavy film thicknesses such as those in the so-called double-build class are desired, defects traceable to oxidation of the copper are encountered, presumably as a result of the multiple exposure of the coated wire to high curing temperatures. The oxidation increases with each succeeding coat, and very poor adhesion and apparently brittle films result, all presumably due to poor cure of the enamels constituting the successive coats.

We have now found that the incorporation of certain amines in the silicone and silicone-copolymer enamels prevents oxidation of the copper and overcomes the inhibiting effects of copper on the cure of the enamels.

Accordingly, it is an object of this invention to provide improved silicone-containing wire enamels protected against the cure-inhibiting effects of copper.

It is a further object to provide improved silicone copolymer wire enamels containing protective amounts of certain organic amines.

Another object is to provide coated copper wire having double-build thicknesses of silicone-containing enamel thereon and free of defects resulting from oxidation of the copper during the coating treatment.

Still another object is to provide coated copper wire of the type last described having good heat- and solvent-resistance with good flexibility and adhesion in the enamel coating thereof.

These and other objects will be apparent from the following detailed description of the invention.

The U. S. Patent No. 2,663,694 of Millar and his copending application Serial No. 320,120, filed November 12, 1952, now Patent No. 2,768,149, describe and claim heat-resistant silicone coating compositions which have been prepared by cobodying selected silicones with selected alkyd resins, thereby yielding what is here termed a silicone copolymer resin. Other silicone-alkyd copolymer resins are described in the U. S. Patent No. 2,587,295 of Doyle, the U. S. Patent No. 2,517,777 of Fenn et al., the U. S. Patents Nos. 2,502,286 and 2,605,243 of Sowa, the U. S. Patents Nos. 2,584,340, 2,584,341, 2,584,343 and 2,589,243 of Goodwin et al, and the British Bowman Patent No. 583,754. Other silicone copolymers can also be benefited by the present invention, such as the silicone-polyvinyl acetal copolymer of U. S. Patent No. 2,506,320. In all such copolymer coatings, the benefits begin to become apparent when the silicone content of the cured coating approaches about 20% of the total weight of resin solids in the cured coating, and are of ready significance when the silicone content is a major percentage of the resin solids.

Any of the "pure" silicone heat-hardenable coatings of the polysiloxane and polysilane types can be significantly benefited by applying the principles of the present invention. The hydrocarbon substituents of the silicon atoms in these coatings can be aliphatic or cyclic or both and either saturated or unsaturated, or both. These substituents can amount to between ½ and 2 groups per silicon atom, but more preferably constitute between 1 and 2 groups per silicon atom. The following U. S. patents disclose a wide variety of pure silicone heat-hardenable, hydrocarbon-substituted polysiloxane and/or polysilane resins appropriate for use as resins in wire enamels and comparable coatings: Reissue No. 23,060, 2,258,218, 2,258,219, 2,258,220, 2,258,221, 2,258,222, 2,476,132, 2,486,162, 2,494,920, 2,495,306, 2,506,320, 2,507,516, 2,516,047, 2,517,777, 2,518,160, 2,521,672, 2,523,037, 2,528,615, 2,542,641, 2,550,003, 2,563,005, 2,571,533, 2,584,835, 2,588,393, 2,590,957, 2,595,727, 2,598,402, 2,605,194 and others.

Any of said resins can be utilized in the present invention by incorporating therewith one or more of the amines which we have discovered to be effective in inhibiting the oxidation of copper and the cure-impairing effects of copper on pure silicone and silicone-copolymer resins.

The amines last referred to are triethanolamine, phenyl-beta-naphthyl amine, and butoxy methyl melamine. The latter is available commercially under the proprietary name of Resimene 878 and is a mixture of butyl ethers of the various methylol groups occurring in melamine-formaldehyde condensation products. These amines have been found to be specific in their effects as shown by our discovery that amines of closely similar compositions are ineffective; e. g., diethanolamine and phenyl-alpha-naphthyl amine. In our investigations we have tested numerous other amines, none of which had any noticeable effect for our purposes.

The three amines mentioned above are employed in amounts between about 1% and 20% by weight of the silicone resin, each amine having an optimum value within this range which is different than the optimum value for the others. In silicone-copolymer resins, triethanolamine is preferably employed in amounts between 5 and 10%, while phenyl-beta-naphthylamine is employed in amounts between about 4% and 8%. Resimene 878 is preferably used in amounts between about 9% and 12%.

We are presently unable to give any suitable explanation for the specificity of these amines for our purposes. The following examples illustrate their obvious effectiveness, however.

*Example 1*

A wire coating was prepared from the following ingredients:

|  | Gallons |
|---|---|
| Silicone alkyd (50% N. V.) | $4^{17}/_{32}$ |
| Triethanolamine (100% N. V.) | $^{3}/_{16}$ |
| Butanol | $^{9}/_{32}$ |
| Total | 5 |

The triethanolamine here amounts to 7% by weight on the solids of the silicone alkyd. This coating was applied to copper wire in eight passes to give a coating thickness of .0020", the coating which was applied at each pass being cured at approximately 1000° F. for 9 seconds before the next pass. Examination of the finished wire revealed that the coating had excellent adhesion and flexibility, and was free of sleeving and copper oxidation. In a comparable run employing the same coating minus the triethanolamine, oxidation and improper cure of underlying coats became evident between the 7th and 8th pass. When the coated wire was subjected to a "snap" test, indications of sleeving and consequent lack of adhesion were apparent.

The silicone alkyd of the above composition was prepared as follows:

A. An alkyd was prepared by mixing 31 parts of 2 ethyl hexoic acid, 29.9 parts of glycerine, C. P., 39.1 parts of phthalic anhydride and 3.5 parts of xylol. The mixture was heated to reflux in a $CO_2$ atmosphere and was refluxed at about 460° F. with a water trap in the system until about 10 parts of water had been separated and the resin had an acid number of 4 or under. The resin was reduced finally with 35.8 parts of xylol, to give a solids content of 69–70 and a viscosity of $Z_1$–$Z_2$.

A 70% N. V. M. silicone resin solution in xylol was prepared by hydrolyzing and condensing an equal molar mixture of phenyl trichlorosilane, methyl trichlorosilane, and monophenyl monomethyl dichlorosilane so as to produce a product having a total of 1⅓ methyl and phenyl radicals per silicon atom, an equal number of methyl and phenyl radicals and a hydroxyl content of 3.61% by weight of resin solids. This siloxanol was produced by hydrolyzing the said equimolar mixture by adding it to an agitated mixture of water and toluol. The water was employed in amount sufficiently in excess of that requisite for hydrolysis that the hydrogen chloride produced and dissolved in the excess water would give a 20 percent by weight aqueous hydrochloric acid. The toluol was employed in amount to yield a 35 percent by weight solution of siloxane resin in the toluol. The resin was transferred to xylol by adding enough xylol to yield a 70 percent solution therein and removing the toluol by vacuum distillation.

The above alkyd and the above silicone resin solution were mixed together in the proportions of 496 parts by weight of the former to 577 parts by weight of the latter. The resulting mass was refluxed until a Z viscosity at 65% N. V. M. had been attained, then the mass was cooled to 220° F. and reduced to 50% N. V. M. with 429 parts of xylol. The reduced solution had an acid number of 2, a viscosity of G–H, and had a weight of 8.55 lbs. per gallon. To each five gallons of the 50% solution was added 1⅓ liquid ounces of a lead and manganese naphthenate drier having 4.5% and .96% by weight of lead and manganese respectively.

*Example 2*

The triethanolamine of Example 1 can be replaced with 6% by weight on the silicone alkyd solids of phenyl-beta-naphthyl amine to give substantially identical results.

*Example 3*

The triethanolamine of Example 1 can be replaced with 10% of Resimene 878 to give equally satisfactory results.

The present invention is probably of greatest commercial utility at the present time in connection with the silicone copolymers since the resins of this class have been found to meet much of the present demand for heat resistant coatings at the price levels which they permit. The higher price levels on pure silicone coatings plus the presently unneeded high heat resistance of these coatings have been a deterrent to their use apart from certain shortcomings which they possess. Accordingly, present demands favor the lower priced, moderately-heat-resistant coatings of the silicone copolymer class.

The art of making alkyd resins which are appropriate for use in preparing silicone-copolymers is amply disclosed in the various patents and patent applications identified above, and needs little further discussion here other than to make it clear that the formulation of the alkyds can be very broad in respect to the kinds and proportions of raw materials employed therein. Thus any of the usual polyhydric alcohols, polycarboxylic acids, fatty acids, glyceride oils or oil acids and solvents commonly used in alkyd resins can be used in the alkyds of the silicone-copolymer resins of this invention as long as compatibility of the alkyd and silicone is secured in the completed silicone-copolymer resin(s).

A wide choice of silicones can also be exercised in selecting the silicone component or components of the silicone-copolymers. As the art already knows, the selected silicone(s) and alkyd(s) must be processed in appropriate manners to provide a finished product in which both components are compatible. The patents and patent application identified above describe these and other aspects so fully that no further discussion here seems warranted.

In view of the wide choice of resins to which this invention can be applied, it will be clear that the minor amount of amine(s) which is incorporated therewith to secure the benefits of the present invention is also subject to wide variations. In addition to varying with the formulation of the particular coating at hand, it varies also with the curing temperatures used, with the time cycle of the coating procedure, with the degree of oxidation-inhibition which is needed or desired, and with the particular amine or mixture of amines that one chooses to use. Accordingly, little can be said in a definite way as to the amount of amine(s) to be incorporated, and the chosen amount should be that which best serves the need at hand. An appropriate selection of amount on such basis is well within the ability of one skilled in the art, as will be readily recognized.

While the present invention pertains mostly to the commercial coating of copper wire, e. g., magnet wire, it can obviously be applied advantageously in the coating of any form of copper whether electrical copper or otherwise where a durable, protective, heat-resistant, heat-hardened coating is desired. In most of such applications, particularly for electrical copper, the electrical-insulating qualities of the coating are of importance. In this connection we have found that the incorporation of effective amounts of our amines is baked wire and conductor coatings of the types herein identified does not impair the insulating quality of the coatings, and in fact, usually improves it as a result of improving the integrity of the applied film(s).

Having now described our invention, what we claim is:

1. A copper conductor coated with a heat-hardened synthetic resin coating of the double-build class, the resin solids of which comprise at least 20% resinous silicones and about 1–20% by weight on said silicones of at least one amine selected from the group consisting of triethanolamine, phenyl-beta-naphthyl amine and butoxy methyl melamine.

2. A copper conductor as claimed in claim 1 wherein the resin solids of said coating comprise at least 50% resinous silicones.

References Cited in the file of this patent

UNITED STATES PATENTS

| | | |
|---|---|---|
| 2,389,807 | McGregor et al. | Nov. 27, 1945 |
| 2,500,842 | MacKenzie | Mar. 14, 1950 |
| 2,528,615 | Smith | Nov. 7, 1950 |
| 2,553,362 | Dannenberg | May 15, 1951 |
| 2,596,450 | Wachter et al. | May 13, 1952 |
| 2,611,727 | Underwood | Sept. 23, 1952 |

FOREIGN PATENTS

| | | |
|---|---|---|
| 130,397 | Australia | Dec. 1, 1948 |